July 6, 1954 M. E. KRUEGER 2,682,907
TRACTION INCREASING MEANS FOR TIRES
Filed Oct. 3, 1951 2 Sheets-Sheet 1
Fig. 1
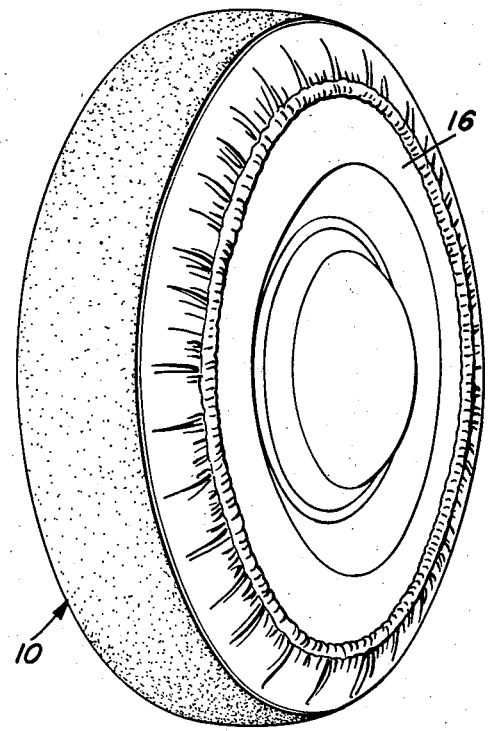
Fig. 2
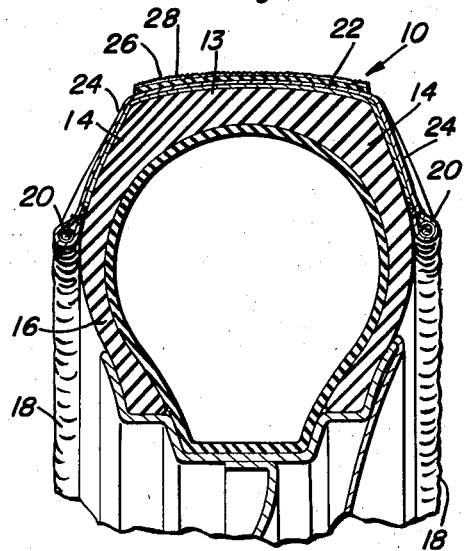
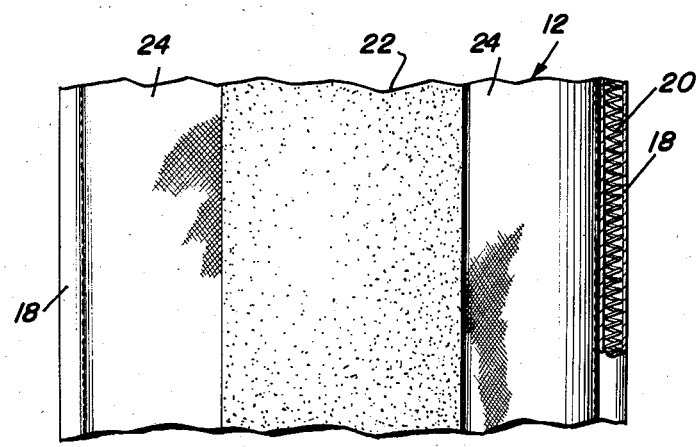
Fig. 3
Max E. Krueger
INVENTOR.
BY *Clarence A. O'Brien*
*and Harvey B. Jackson*
Attorneys July 6, 1954  M. E. KRUEGER  2,682,907
TRACTION INCREASING MEANS FOR TIRES
Filed Oct. 3, 1951  2 Sheets-Sheet 2
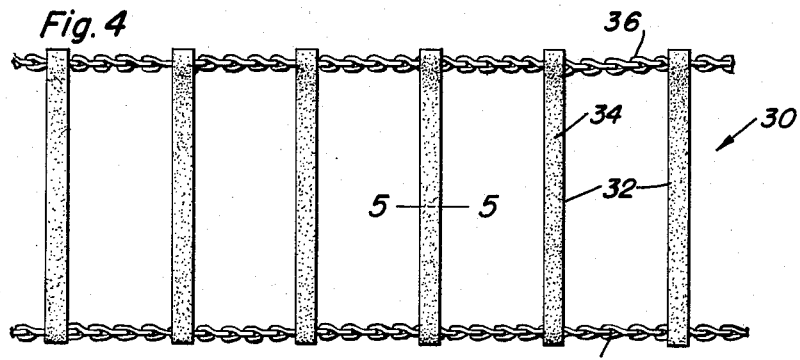
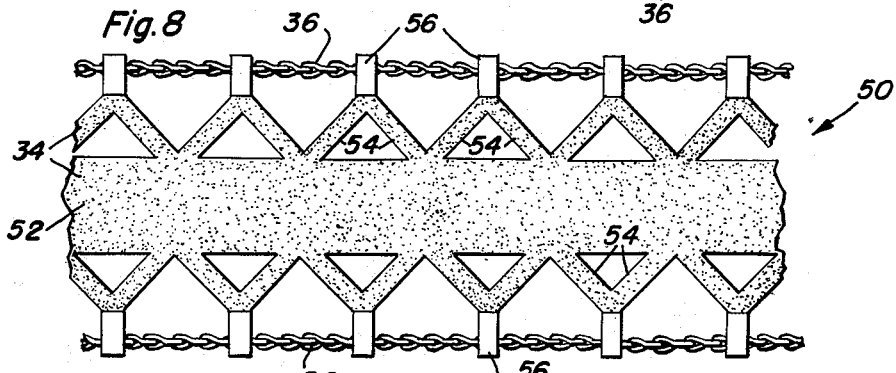
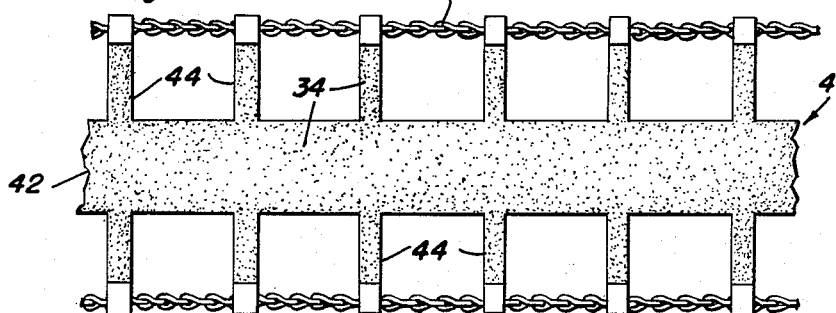
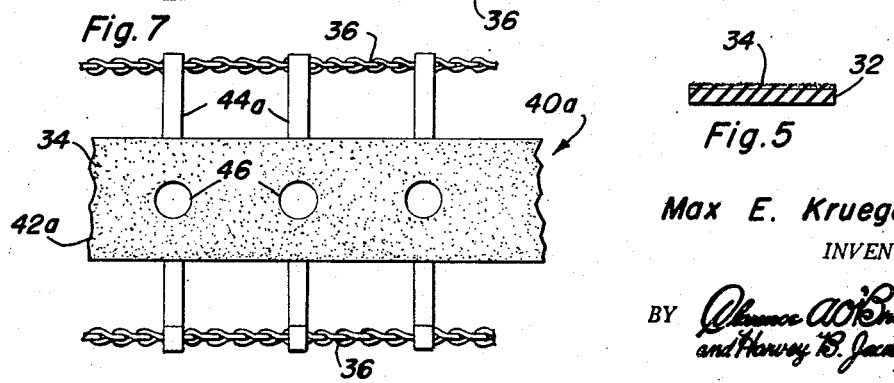
Max E. Krueger
INVENTOR.

Patented July 6, 1954

2,682,907

UNITED STATES PATENT OFFICE 2,682,907

TRACTION INCREASING MEANS FOR TIRES

Max E. Krueger, Grand Forks, N. Dak.

Application October 3, 1951, Serial No. 249,548

1 Claim. (Cl. 152—222)

This invention relates to new and useful improvements and structural refinements in traction increasing means for vehicle tires, and the principal object of the invention is to provide apparatus of the character herein described, which may be conveniently and effectively installed in position on the tire to substantially increase the traction thereof while travelling over mud, snow, ice or other slippery surfaces.

Some of the advantages of the invention reside in its simplicity of construction, in its dependable operation and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention applied to a tire;

Figure 2 is a transverse sectional view thereof;

Figure 3 is a fragmentary plan view of the invention, the same being partially broken away;

Figure 4 is a fragmentary plan view of a modified embodiment of the invention;

Figure 5 is a sectional detail, taken substantially in the plane of the line 5—5 in Figure 4;

Figure 6 is a fragmentary plan view of a further modified embodiment of the invention;

Figure 7 is a fragmentary plan view of another modified embodiment, and

Figure 8 is a fragmentary plan view of a still further modified embodiment of the invention.

Like characters of reference are employed to designate like parts in the specification and throughout the several views.

Referring now to the accompanying drawings in detail, more particularly to Figures 1-3 inclusive, the invention consists of a traction increasing device which is designated generally by the reference character 10 and embodies in its construction an elongated member 12 of flexible material, preferably canvas, or the like, which is adapted to extend peripherally around the tread 13 and side portions 14 of a tire 16, the side edges of the member 12 being provided with annular hems 18 having annular coil springs 20 disposed therein for the purpose of contracting the member 12 and sustaining the same in position on the tire.

The member 12 is in the form of an imperforate strip having a central longitudinal band region 22 and lateral band regions 24 which are disposed, respectively, at the tread and side portions of the tire, and if desired, the entire member 12 may consist of two thicknesses of material so as to substantially increase its strength and facilitate formation of the aforementioned hems 18, as will be clearly apparent from Figure 2. In any event, while the lateral band regions 24 of the member 12 are plain, the central band region 22 is provided with a coating 26 of aluminum oxide impregnated with abrasive particles and applied to the band region 22 by adhesive 28, so as to substantially increase the traction of that portion of the device which is in contact with the ground.

The modified form of the invention illustrated in the accompanying Figures 4 and 5 simply consists of an elongated member 30 adapted to extend peripherally around a tire and comprising a plurality of transversely extending, circumferentially spaced strips 32 which are provided with aluminum oxide coating, impregnated with abrasive material, as indicated at 34. The ends of the strips 32 are suitably affixed to annular retaining means 36, such as for example, chains, which are disposed at the opposite sides of a tire and serve to sustain the entire device in position thereon.

Referring now to the further modified embodiment of the invention illustrated in the accompanying Figure 6, the elongated member 40, adapted to extend peripherally around a tire, comprises a central peripheral band 42 and a plurality of strap elements 44 which extend laterally from opposite side edges of the band and have their outer ends connected in any suitable manner to the annular sustaining means 36, it being noted that the band 42 and all but the outer extremities of the strap elements 44 are coated with aluminum oxide impregnated with abrasive particles, as indicated at 34.

The further modified form of the invention designated by the reference character 40a in Figure 7 is substantially the same as that of Figure 6, with the exception that the central band member 42a thereof is provided with a plurality of circumferentially spaced apertures 46 to further increase traction. If desired, the abrasive, aluminum oxide coating need not be provided on the strap elements 44a.

Finally, the still further modified embodiment of the invention designated generally by the reference character 50 in Figure 8 comprises an elongated member adapted to extend peripherally around the tire, said member including a central peripheral band 52 and a plurality of strap elements 54 which extend laterally from opposite side edges of the band 52 and are preferably arranged in outwardly convergent relationship, the convergent outer ends of each pair of strap elements being provided with tab portions 56 for connection to the annular sustaining means 36. The band 52 as well as the strap elements 54 are coated with abrasive impregnated aluminum oxide as indicated at 34.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

Traction increasing means for tires comprising a flexible imperforate non-resilient elongated band adapted to extend peripherally around the tread of a tire, a plurality of strap elements extending laterally from opposite side edges of said band, said elongated band and said strap elements being provided with an outer coating of aluminum oxide impregnated with abrasive particles, annular means spaced from said elongated band for securing said traction increasing means on a tire, said strap elements each being substantially Y-shaped and having diverging arms integrally formed with an outwardly extending leg, said legs being secured to said annular means, said arms being integral with said elongated band.

References Cited in the file of this patent

UNITED STATES PATENTS

| Number | Name | Date |
|---|---|---|
| 1,175,624 | Fawkes | Mar. 14, 1916 |
| 1,189,223 | Albrecht | July 4, 1916 |
| 1,229,115 | Metcalf | June 5, 1917 |
| 1,330,988 | Sayre | Feb. 17, 1920 |
| 1,342,753 | McGeorge | June 8, 1920 |
| 1,346,226 | Mager | July 13, 1920 |
| 1,625,593 | Cross | Apr. 19, 1927 |
| 1,908,808 | Auciunas | May 16, 1933 |
| 1,930,585 | Covey | Oct. 17, 1933 |